United States Patent [19]
Lestraden

[11] Patent Number: 4,514,929
[45] Date of Patent: May 7, 1985

[54] CELL

[75] Inventor: Jacobus W. Lestraden, Sassenheim, Netherlands

[73] Assignee: Schulte & Lestraden B.V., Sassenheim, Netherlands

[21] Appl. No.: 501,188

[22] Filed: Jun. 6, 1983

[30] Foreign Application Priority Data

Jun. 10, 1982 [NL] Netherlands ............ 8202342

[51] Int. Cl.³ .............................................. A01G 13/00
[52] U.S. Cl. ............................................ 47/17; 47/18
[58] Field of Search ............... 47/17, 18, 39, 60, 82, 47/83, 86; 252/62

[56] References Cited

U.S. PATENT DOCUMENTS

| | | | |
|---|---|---|---|
| 3,314,192 | 4/1967 | Park | 47/18 |
| 3,664,063 | 5/1972 | Ware | 47/39 |
| 4,226,908 | 10/1980 | Yoshino et al. | 252/62 |
| 4,244,145 | 1/1981 | Polacsek | 47/17 |
| 4,258,501 | 3/1981 | Brown | 47/39 |
| 4,292,762 | 10/1981 | Fogg et al. | 47/17 |

FOREIGN PATENT DOCUMENTS

| | | |
|---|---|---|
| 356331 | 5/1974 | Austria . |
| 888400 | 5/1983 | Belgium . |
| 2477833 | 3/1980 | France . |
| 8004859 | 4/1982 | Netherlands . |
| 826101 | 12/1959 | United Kingdom . |

Primary Examiner—Robert A. Hafer
Assistant Examiner—Bradley M. Lewis
Attorney, Agent, or Firm—Oblon, Fisher, Spivak, McClelland & Maier

[57] ABSTRACT

A cell comprising one or more stands in which crop containers are arranged in a plurality of layers one above the other and light sources are arranged between the containers, whereby between a light source (or light sources) and a container located above said light source(s) there is arranged a plate of insulating material, at least the side of the plate facing light source(s) being reflecting.

18 Claims, 10 Drawing Figures

CELL

The invention relates to a cell comprising one or more stands in which crop containers are arranged in a plurality of layers one above the other, whilst light sources are arranged between said containers.

Cells of the kind set forth, which are completely closed, can be effectively employed for growing plants, since with the aid of appropriate devices favourable climatic conditions can be maintained in the cells, whilst the plants are exposed to artificial light sources.

The invention has for its object to provide such a cell in which whilst using a simple and efficacious structure, the light emitted by the light sources can be utilized to the optimum.

According to the invention a plate of insulating material is arranged between a (the) light source(s) and a holder located above said light source(s), at least the side of said plate facing the light source(s) being reflective.

When using the construction embodying the invention it is not necessary to arrange a reflecting hood for each individual light source, since with the aid of a simple reflecting plate, satisfactory reflection of light upwardly emitted by a light source can be obtained in the direction towards the plants. Since the plate is made from insulating material, the undersides of the holders are, in addition, prevented from absorbing excessive amounts of heat resulting from the irradiation by the light sources.

It is efficient to make the plate from polystyrene foam, since this white material is not only insulating but also reflecting.

In accordance with the invention mounting and maintenance can be appreciably simplified when the light source(s) and the plate located above the same are arranged in a carrying frame which can be releasably disposed in a stand.

A further aspect of the invention relates to a cell for growing crop with the aid of light sources arranged in the cell. According to the invention the walls of the cell are reflecting.

Surprisingly it has been found that by ensuring a satisfactory reflection of parts irradiated by the light sources, the number of light sources and hence the power of these light sources can be materially reduced as compared with those of conventional cells, in which optimum reflection is not ensured.

The invention will now be described more fully with reference to an embodiment of the construction in accordance with the invention schematically shown in the accompanying Figures.

Figure 1:
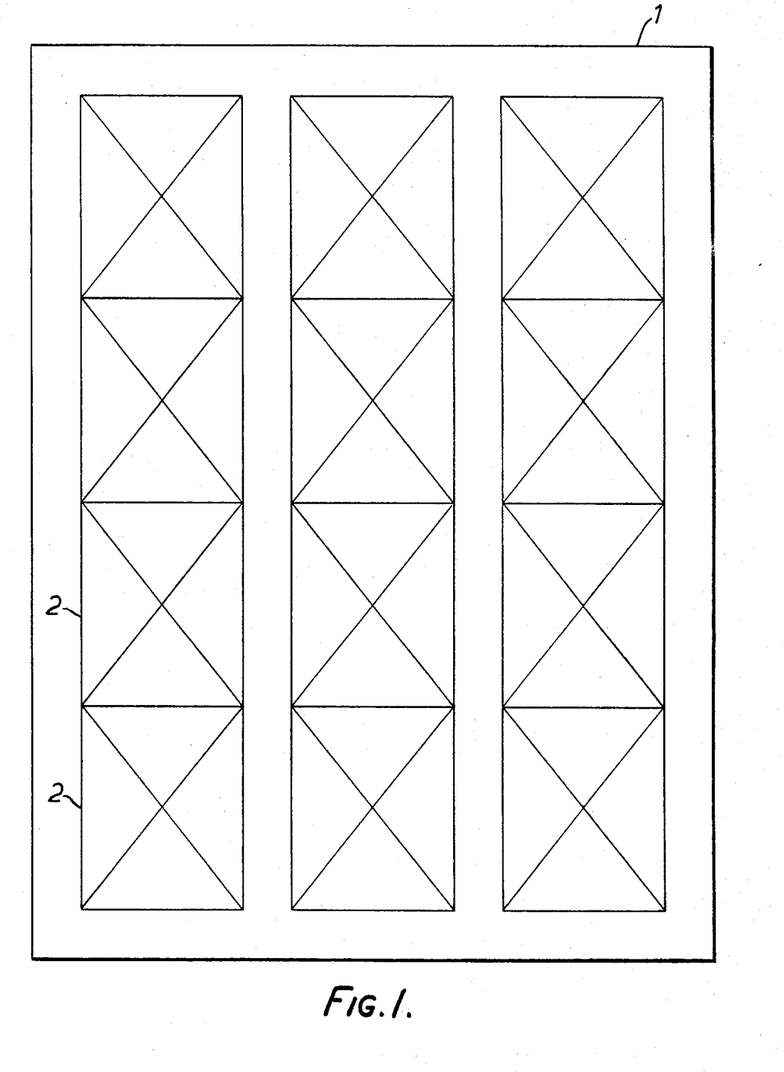
FIG. 1 is a schematic plan view of a cultivating cell with stands arranged therein.
Figure 2:
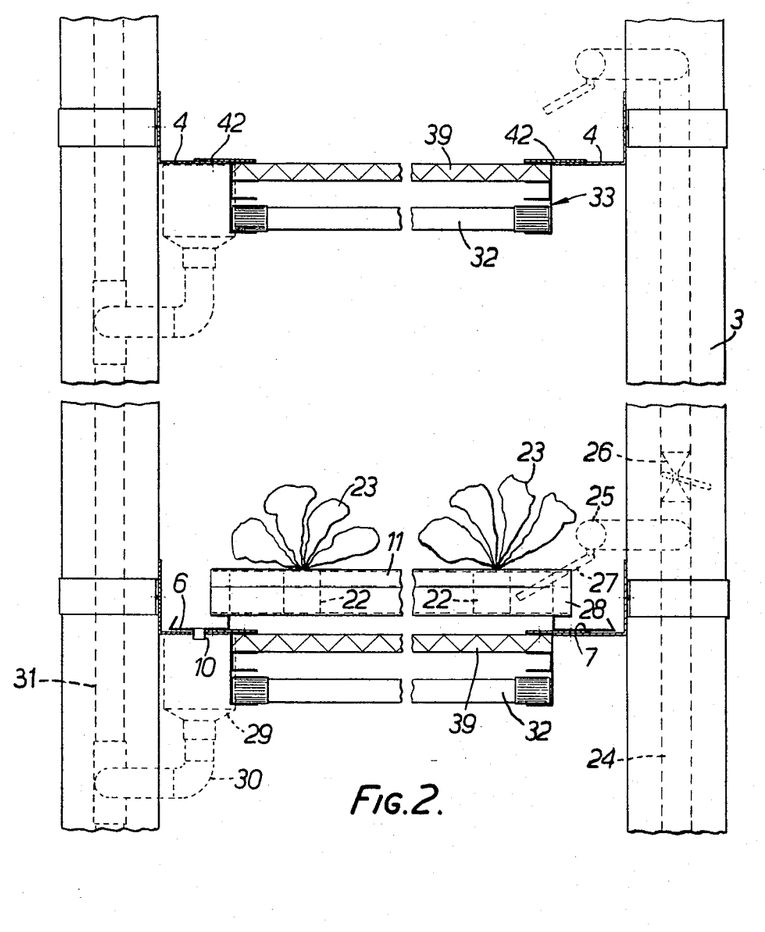
FIG. 2 is a schematic elevational view of part of a stand with trays or gutters arranged therein and lighting means.

For growing crops there are frequently used closed cells or climatized spaces 1, in which a plurality of stands 2 can be disposed side by side and one behind the other as is schematically shown in FIG. 1. Such cells may be entirely closed and be provided with insulating walls, whilst means are provided for controlling the climatic conditions such as temperature, humidity, air condition and the like in the cell. Each stand may be provided with vertical columns 3 near the sides and at the corners of the stand, which columns may be interconnected with the aid of struts or the like (not shown). Columns 3 standing near one side of the stand have fastened to them at equal intervals carrying beams 4 located one above the other and being formed in the embodiment shown by angle-section irons, which are secured to the columns in a manner such that a limb being in contact with the column concerned extends vertically, the other limb adjoining the lower end of said limb and extending in the direction towards the opposite side of the stand (FIG. 2).

Two carriers 4 arranged near opposite sides of the stand at the same level can be used for supporting a cultivating platform 5. Such a cultivation platform is shown in greater detail in FIGS. 3 to 7.

Figure 6:
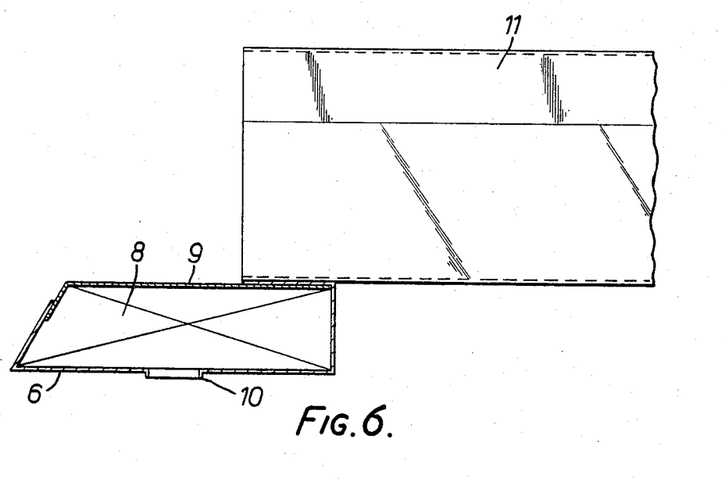
FIG. 6 is an enlarged elevational view of the structure of FIG. 3 taken on the line VI—VI.

From these Figures it is apparent that such a cultivation platform 5 comprises two parallel, channel-shaped parts 6 and 7, which may be closed at their ends by sealing blocks 8 of elastic material slipped into the channel-shaped parts, which blocks may be provided at the top with a sealing strip 9 fitting in the channel-shaped parts concerned (FIG. 6).

Figure 3:
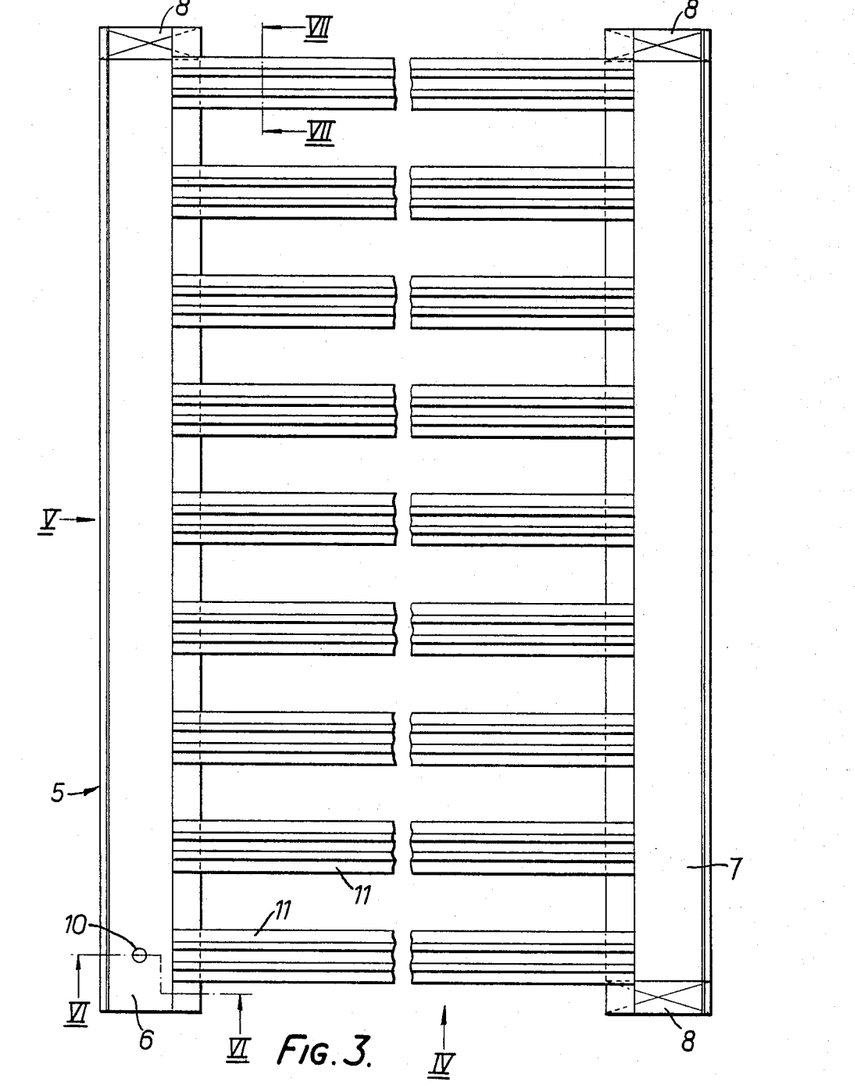
FIG. 3 is a plan view of a cultivating platform comprising a plurality of trays or gutters.
Figure 4:
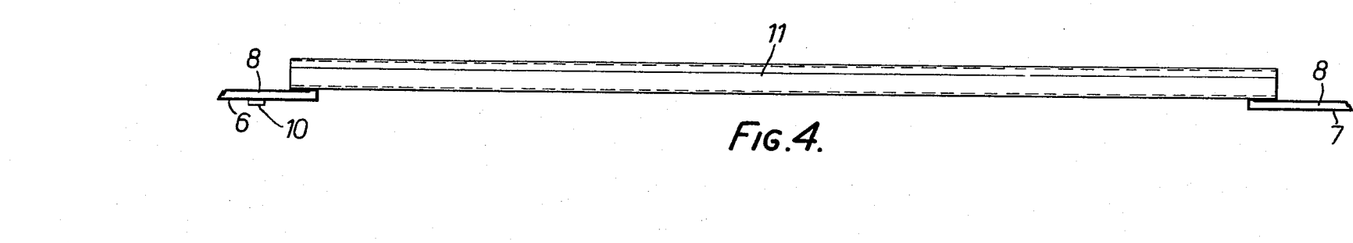
FIG. 4 is an elevational view of the structure of FIG. 3 in the direction of the arrow IV in FIG. 4.
Figure 5:
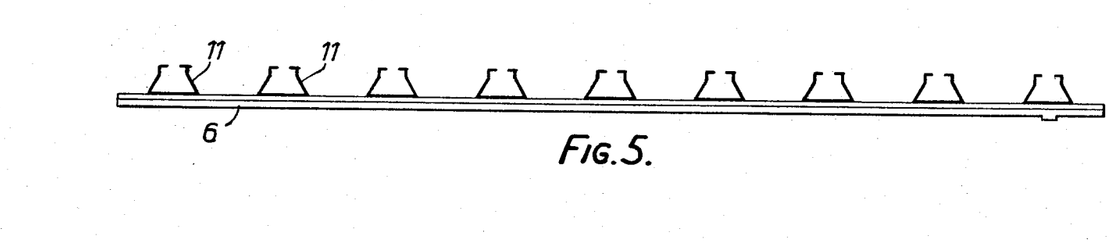
FIG. 5 is an elevational view of the structure of FIG. 3 in the direction of the arrow V in FIG. 3.

The channel-shaped part 6 is furthermore provided near one end with an outlet spout 10.

The channel-shaped parts 6 and 7 communicate with one another by a plurality of parallel trays or gutters 11 extending at right angles to the direction of length of the channel-shaped parts 6 and 7, the ends thereof being fixed to the channel-shaped parts 6 and 7.

Figure 7:
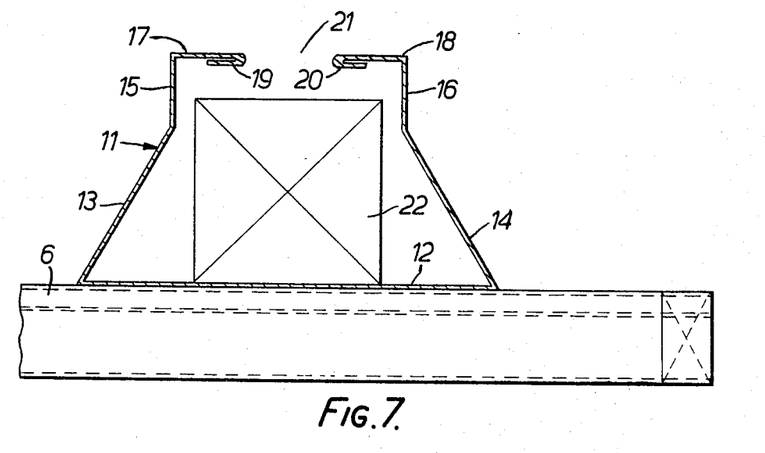
FIG. 7 is an enlarged sectional view of part of the structure of FIG. 3 taken on the line VII—VII.

The elongate trays or gutters 11 can each be made by folding a piece of sheet material and, as will be particularly apparent from FIG. 7, they have an elongate bottom plate 12, the longitudinal edges of which are adjoined by upwardly inclined, converging sidewall parts 13 and 14. The top edges of the sidewall parts 13 and 14 are adjoined by vertical sidewall parts 15 and 16 respectively extending upwards from the top edges of the sidewall parts 13 and 14, The sidewall parts 15 and 16 terminate in horizontal, converging wall parts 17 and 18 respectively, the ends 19 and 20 of which are inwardly bent over through 180° as will be seen from FIG. 7. The edges of the facing wall parts 17 and 18 of the tray or gutter 11 form a comparatively narrow gap 21 extending in the direction of length of the tray or gutter. Such a tray or gutter is particularly suitable for holding a plurality of pots or cultivation blocks 22 or the like arranged side by side, each pot or cultivation block of compressed cultivation material or the like generally containing a seedling or a seed for growing a plant 23. As is schematically shown in FIG. 2 the leaf of the plant or the like will lie above the tray or gutter and be screened from the interior of the tray or gutter by the wall parts 17 and 18 of the tray or gutter.

Such a cultivation platforms can be effectively arranged in a stand schematically shown in FIG. 2 so that the channel-shaped parts 6 and 7 will bear on the carriers 4 in the manner shown in FIG. 2.

For supplying water to the trays or gutters 11 thus arranged in the stand 2 side by side and one above the other, an upwardly extending feed duct 24 is arranged near one side of the stand 2. The feed duct 24 has branch ducts 25 at equal intervals one above the other. The feed duct 24 may be provided with several cocks 26 for controlling the stream of water to the branch ducts 25. For each tray or gutter 11 lying at the level concerned, each branch duct 25 has a tap pipe 27 disposed so that the end thereof extends into the tray or gutter near one end thereof. This end of the tray or gutter located near the channel-shaped part 7 can be closed with the aid of a shutting block 28 preferably of slightly elastic material, which can be readily slipped into and out of the gutter concerned so that the supplied water is prevented from flowing into the channel-shaped part 7. The cultivation platforms is preferably designed so that the trays or gutters 11 slight slope down in the direction of the channel-shaped part 6. The outlet spout 10 of this channel-shaped part 6 is located above a collecting trough 29 which communicates through a connecting duct 30 with an outlet duct 31 located near the side of the stand femote from the feed duct 24.

During operation a fluid, for example, water containing nutrients can be supplied continuously or at desired instants to the trays or gutters 11 lying one above the other, whilst any excess fluid can readily flow away through the spaces located at the side of the pots, cultivation blocks 22 or the like in the tray or gutter 11 below the sloping wall parts 13 and 14. In order to avoid that a large part of the fluid should flow away too rapidly through such a space, the bottom plate 12 of the tray or gutter 11 is preferably slightly curved or sharply bent so that the middle portion of the bottom plate is located at a lower level than the longitudinal edges of the bottom plate adjoining the sidewall parts 13 and 14.

Since the plants require light for growing, this embodiment comprises light sources formed by the so-called TL lamps 32. For supporting these light sources is used a carrying frame 33 shown in greater detail in FIGS. 8 to 10. Of course, light sources other than TL lamps may be used for illumination.

Figure 8:
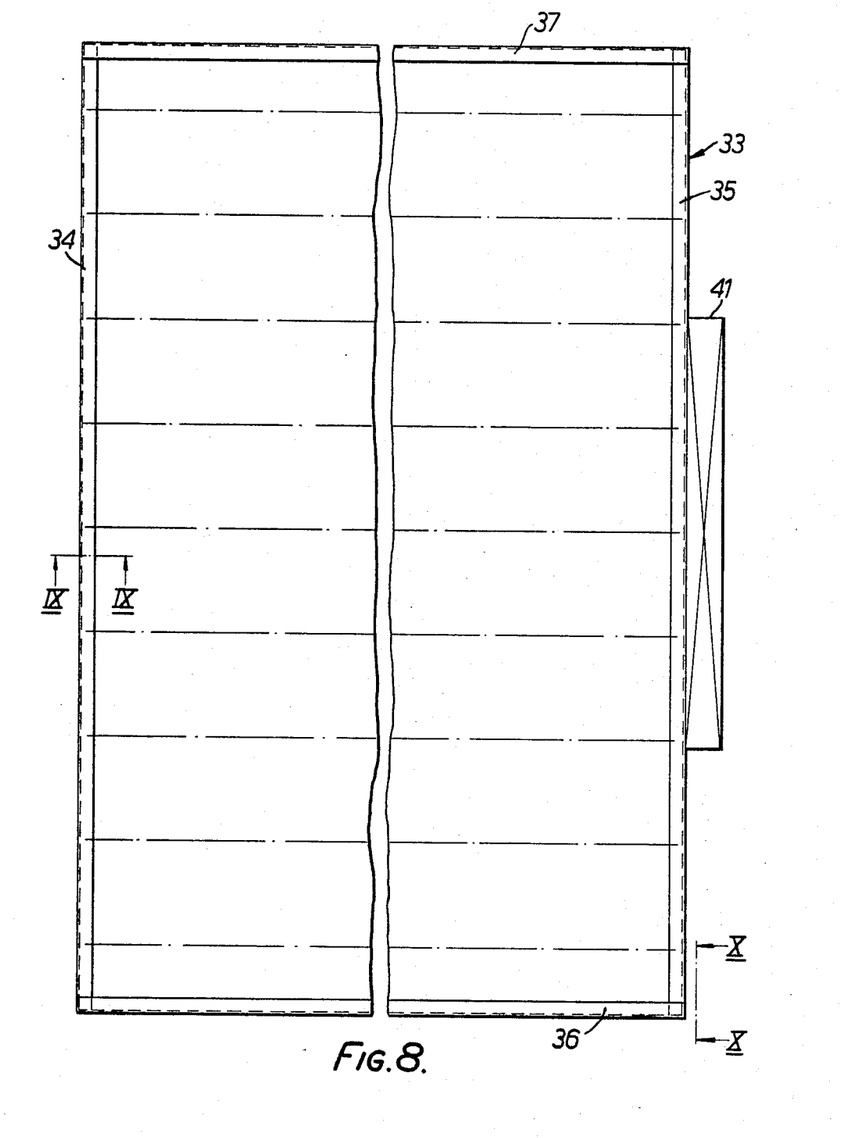
FIG. 8 is a plan view of a frame supporting the lamps.
Figure 9:
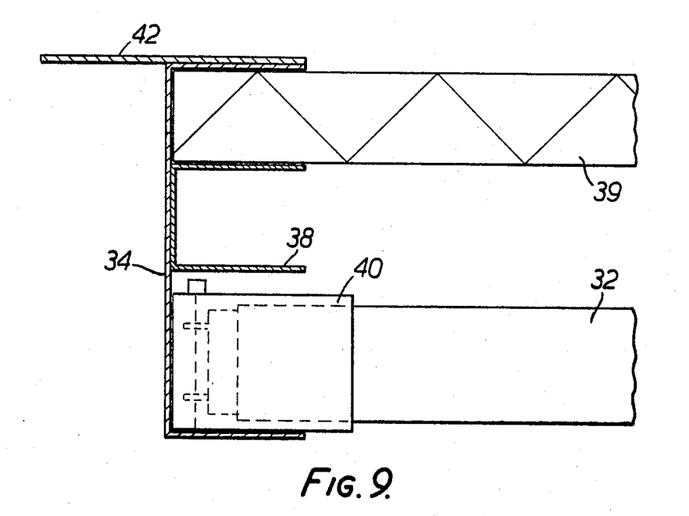
FIG. 9 is an enlarged sectional view of the frame of FIG. 8 taken on the line IX—IX.
Figure 10:
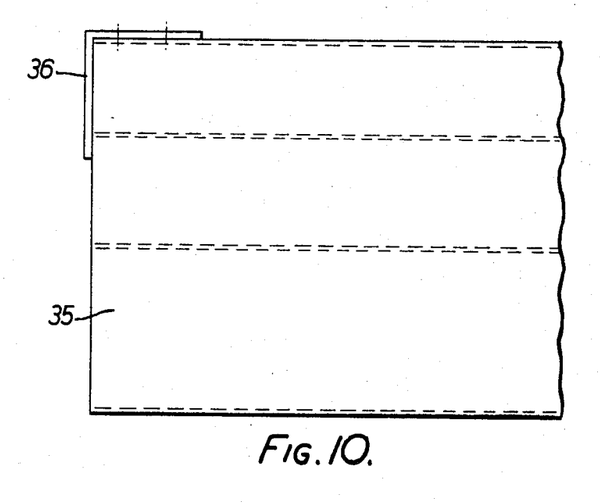
FIG. 10 shows part of the view of FIG. 8 taken on the line X—X.

From FIGS. 8 to 10 it will be apparent that the carrying frame 33 is formed by two parallel, U-section beams 34 and 35 connected at their ends by angle-section irons 36 and 37 respectively being at right angles to said beams. The U-section beams 34 and 35 are disposed so that the limbs of these beams extend towards one another away from the webs. Between the limbs of the U-section beams further U-section beams 38 are fastened to said beams in the manner shown in FIG. 9. It will be apparent that in this way a rigid structure of the beams forming the sides of the carrying frame is obtained.

Between the upper limbs of the beams 34 and 35 and the upper limbs of the beams 38 is slipped a plate 39 of insulating material, preferably polystyrene foam extending between the beams 34 and 35.

The top sides of the lower limbs of the U-section beams 34 and 35 are provided with fittings 40 for the TL lamps 32. One side of a carrying frame for the TL lamps is furthermore provided with a housing 41 accommodating the starters and the like for the TL lamps.

FIG. 9 furthermore shows that the upper limbs of the U-section beams 34 and 35 have fastened to them strips 42 extending in the direction of length of said beams so that on the distal sides of the beams 34 and 35 these strips project beyond the beams 34 and 35. It is noted that said strips 42 are not shown in FIGS. 8 and 10.

As is shown in FIG. 2 the parts of the strips 42 projecting beyond the beams 34 and 35 can be used for supporting the framework carrying the plate 39 and the TL lamps 32 by causing these projecting parts of the strips 42 to bear on the carriers 4 below the channel-shaped parts 6 and 7.

It will be obvious that the units formed by the cultivation platforms 5 and the frameworks supporting the TL lamps 32 and the insulating plate 39 can be readily introduced into the stand 2 and can be readily removed therefrom so that such units can be readily arranged at the desired levels in the stand and be taken out respectively.

By making the plate 39 from polystyrene foam it is avoided that the undersides of the trays or gutters 11 are heated by the lamps 32 located below the same, which might give rise to undesirably high temperatures near the undersides of said trays or gutters. At the same time this white polystyrene foam constitutes a statisfactorily reflecting material so that the light striking the plates 39 is satisfactorily reflected.

It was a surprise to find that, when a satisfactory reflection of the light emitted by the light sources arranged in the cell is ensured, a comparatively small number of lamps will suffice for irradiating the plants. According to the invention the inner sides of the cell walls and preferably also the ceiling of the cell are also provided with reflecting material. This may be a reflective paint or it may also be efficient to use polystyrene foam so that both the good insulation properties of this material and the good reflection thereof can be utilized. Also further parts inside the cell, for example, the parts of the stands supporting the trays or gutters 11 may be made of satisfactorily reflecting material or may be covered with satisfactorily reflecting material, for example, reflective paint, polystyrene foam or the like. As a matter of course, other insulating material than polystyrene foam may be used, care being taken that the desired surfaces should have the required reflection properties.

The plate 39 is preferably arranged in the carrying frame 33 so as to be readily removable so that this plate may be drawn out when irradiation of the crops from below is desired, for example, when the crop is strongly hanging down between the trays or gutters.

It is furthermore possible to arrange the plate 39 at different levels in the frame 33, for example, by arranging the plate between the limbs of the angle-section irons 38 rather than in the position shown.

The top side of the plate may be anti-reflecting, for example, it may be black, if heating of the trays or gutters has to be minimized.

If for optimum growth of a crop a vertical air stream and/or heat transfer or the like are desired, the plates 39 may be perforated. The columns 3 and preferably also the struts connecting said columns 3 are preferably formed by circular-section or elliptic profiles so that air streams produced in the cells meet a minimum resistance.

As a matter of course, variations and/or additions and/or modifications of the embodiment described above are possible.

For example, the beams 34 and 35 of the frame 33 may be constructed in the form of Z-shaped profiles, the upper, outwardly extending limbs of these profiles serving to support the frame 33 rather than the above-mentioned strips 42.

To the upright limbs of such Z-shaped profiles can then be fastened strips or one or two U-section profiles for supporting the plate 39.

I claim:

1. A cell for growing plants, said cell comprising:
   (a) at least one stand in which a plurality of crop containers are arranged in a plurality of layers one above the other;
   (b) at least one light source located beneath a first one of said plurality of crop containers and above a second one of said plurality of crop containers; and
   (c) a plate made from a heat insulating material disposed between said at least one light source and said first one of said plurality of crop containers, the side of said plate facing said at least one light source being light reflecting,
   whereby:
   (d) said plate reflects light from said at least one light souce downwardly on said second one of said plurality of crop containers and
   (e) said plate substantially prevents the underside of said first one of said plurality of crop containers from absorbing heat from said at least one light source.

2. A cell as recited in claim 1 wherein said plate is made from polystyrene foam.

3. A cell as recited in claim 1 wherein said at least one light source and said first one of said plurality of crop containers are arranged in a carrying frame which is releasably arranged in said at least one stand.

4. A cell as recited in claim 3 wherein said carrying frame comprises two longitudinal beams provided with supports for said plate.

5. A cell as recited in claim 1 ans further comprises means for locating said plate in said stand at a plurality of different heights above said second one of said plurality of crop containers and below said first one of said plurality of crop containers.

6. A cell as recited in claim 3 wherein said carrying frame comprises:
   (a) two parallel, U-sectioned longitudinal beams which are interconnected at their ends by transverse beams, the legs of each of said U-sectioned longitudinal beams facing the legs of the other one of said U-sectioned longitudinal beams, and
   (b) a shelf projecting from said web of each of said U-sectioned longitudinal beams toward a corresponding shelf projecting from the web of the other one of said U-sectioned longitudinal beams at a distance below the upper leg of the corresponding one of said U-sectioned longitudinal beams such that said plate may be inserted between said shelves and the upper legs of said U-sectioned longitudinal beams.

7. A cell as recited in claim 3 wherein said at least one light source is a TL lamp supported by said carrying frame.

8. A cell as recited in claim 6 wherein:
   (a) said at least one light source is a TL lamp disposed perpendicularly to said U-sectioned longitudinal beams and
   (b) the fittings for said TL lamp are fastened to one of said U-sectioned longitudinal beams near the lower end thereof.

9. A cell as recited in claim 6 wherein the starter for said TL lamp is disposed in a housing which is fastened to one of said U-sectioned longitudinal beams.

10. A cell as recited in claim 6 wherein the upper ends of said U-sectioned longitudinal beams are provided with projecting parts for supporting said carrying frame on corresponding parts of said at least one stand.

11. A cell as recited in claim 6 wherein said shelves comprise the upper legs of further U-sectioned longitudinal beams the webs of which are fastened to the webs of the U-sectioned longitudinal beams recited in subparagraph (a) of claim 6, the legs of each of said further U-sectioned longitudinal beams facing the legs of the other one of said further U-sectioned longitudinal beams.

12. A cell as recited in claim 1 wherein the side of said plate facing said first one of said plurality of crop containers is anti-reflecting.

13. A cell as recited in claim 1 wherein said plate has perforations therethrough permitting vertical air streams.

14. A cell as recited in claim 1 wherein at least part of the surface of said at least one stand is light-reflecting.

15. A cell as recited in claim 1 wherein:
   (a) said at least one stand is surrounded by an enclosure and
   (b) the interior walls of said enclosure are light-reflecting.

16. A cell as recited in claim 15 wherein the interior walls of said enclosure are heat insulating.

17. A cell as recited in claim 15 wherein the interior walls of said enclosure are coated with a light-reflecting and heat-insulating material.

18. A cell as recited in claim 17 wherein said material is polystyrene foam.

* * * * *